: US009313785B2

(12) United States Patent
Zhang et al.

(10) Patent No.: US 9,313,785 B2
(45) Date of Patent: Apr. 12, 2016

(54) CELL IDENTIFIER ALLOCATION APPARATUS AND METHOD, BASE STATION, READABLE PROGRAM AND MEDIUM

(71) Applicant: FUJITSU LIMITED, Kawasaki-shi, Kanagawa (JP)

(72) Inventors: Yi Zhang, Beijing (CN); Hua Zhou, Beijing (CN); Yuantao Zhang, Beijing (CN); Jianming Wu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 214 days.

(21) Appl. No.: 14/066,145

(22) Filed: Oct. 29, 2013

(65) Prior Publication Data

US 2014/0050175 A1  Feb. 20, 2014

Related U.S. Application Data (63) Continuation of application No. PCT/CN2011/073517, filed on Apr. 29, 2011.

(51) Int. Cl.
*H04W 72/04* (2009.01)
*H04W 8/26* (2009.01)
(Continued)

(52) U.S. Cl.
CPC .............. *H04W 72/044* (2013.01); *H04W 8/26* (2013.01); *H04W 64/003* (2013.01); *H04W 76/005* (2013.01); *H04W 84/08* (2013.01); *H04W 84/18* (2013.01); *H04W 88/085* (2013.01)

(58) Field of Classification Search
CPC .................................. H04W 64/003
USPC .......................... 370/252, 328, 329
See application file for complete search history.

(56) References Cited

U.S. PATENT DOCUMENTS

| 5,943,621 | A | * | 8/1999 | Ho | ......... | H04W 60/00 |
| | | | | | | 455/440 |
| 7,920,875 | B2 | * | 4/2011 | Anderson | ........... | G01S 5/00036 |
| | | | | | | 455/456.1 |

(Continued)

FOREIGN PATENT DOCUMENTS

WO   2009/118378   10/2009

OTHER PUBLICATIONS

International Search Report issued for corresponding International Application No. PCT/CN2011/073517, mailed Feb. 16, 2012.

*Primary Examiner* — Raj Jain
*Assistant Examiner* — Andrew C Lee
(74) *Attorney, Agent, or Firm* — Myers Wolin, LLC (57) ABSTRACT

A cell identifier allocation apparatus and method, a base station, a readable program and a medium including acquiring location information of a macro base station and location information of each of a plurality of remote transmitting apparatuses connected to the macro base station; determining relative distances between the plurality of remote transmitting apparatuses and relative distances between the macro base station and each of the plurality of remote transmitting apparatuses; classifying the macro base station and the plurality of remote transmitting apparatuses into a plurality of sets, according to the relative distances between the plurality of remote transmitting apparatuses and the relative distances between the macro base station and each of the plurality of remote transmitting apparatuses; allocating cell identifiers to the plurality of remote transmitting apparatuses; and generating information to be transmitted to corresponding remote transmitting apparatus according to the allocated cell identifier.

20 Claims, 6 Drawing Sheets

(51) Int. Cl.

| | | |
|---|---|---|
| *H04W 84/08* | (2009.01) | |
| *H04W 84/18* | (2009.01) | |
| *H04W 76/00* | (2009.01) | |
| *H04W 64/00* | (2009.01) | |
| *H04W 88/08* | (2009.01) | |

(56) References Cited

U.S. PATENT DOCUMENTS

| | | | | |
|---|---|---|---|---|
| 8,219,116 B1* | 7/2012 | Ji | H04W 64/003 | 455/443 |
| 8,416,710 B2* | 4/2013 | Brisebois | H04W 24/00 | 370/254 |
| 8,660,035 B2* | 2/2014 | Zhang | H04B 7/15507 | 370/255 |
| 8,842,604 B2* | 9/2014 | Luo | H04L 5/0048 | 370/328 |
| 2003/0143997 A1* | 7/2003 | Sawada | H04W 8/02 | 455/432.1 |
| 2003/0148774 A1* | 8/2003 | Naghian | H04W 64/00 | 455/456.1 |
| 2004/0203915 A1* | 10/2004 | van Diggelen | G01S 5/0027 | 455/456.1 |
| 2005/0113117 A1* | 5/2005 | Bolin | H04W 64/00 | 455/456.6 |
| 2006/0014548 A1* | 1/2006 | Bolin | H04W 64/00 | 455/456.1 |
| 2007/0099561 A1* | 5/2007 | Voss | H04W 24/00 | 455/12.1 |
| 2008/0267153 A1* | 10/2008 | Mukherjee | H04L 63/104 | 370/338 |
| 2009/0047958 A1* | 2/2009 | Rimhagen | H04J 11/0093 | 455/436 |
| 2009/0098890 A1* | 4/2009 | Vasudevan | H04W 68/06 | 455/458 |
| 2009/0239533 A1* | 9/2009 | Somasundaram | H04J 11/0093 | 455/434 |
| 2010/0040000 A1* | 2/2010 | Jang | H04W 24/02 | 370/329 |
| 2010/0124179 A1* | 5/2010 | Lee | H04W 48/08 | 370/252 |
| 2010/0136996 A1* | 6/2010 | Han | H04W 24/02 | 455/452.1 |
| 2010/0151894 A1* | 6/2010 | Oh | H04W 72/082 | 455/509 |
| 2010/0159927 A1* | 6/2010 | Toda | H04W 48/16 | 455/435.2 |
| 2011/0053616 A1* | 3/2011 | Lee | H04W 68/06 | 455/458 |
| 2011/0059744 A1 | 3/2011 | Won et al. | | |
| 2011/0064032 A1* | 3/2011 | Sun | H04L 5/0007 | 370/328 |
| 2011/0086652 A1* | 4/2011 | So | H04W 24/02 | 455/501 |
| 2011/0124334 A1* | 5/2011 | Brisebois | H04W 48/16 | 455/434 |
| 2011/0177826 A1* | 7/2011 | Huang | H04W 64/00 | 455/456.1 |
| 2011/0190000 A1* | 8/2011 | Kwun | H04W 72/00 | 455/450 |
| 2011/0195720 A1* | 8/2011 | Han | H04B 7/2606 | 455/450 |
| 2011/0223901 A1* | 9/2011 | Swarts | H04L 27/2657 | 455/422.1 |
| 2012/0015649 A1* | 1/2012 | Li | H04W 36/0061 | 455/434 |

* cited by examiner

CELL IDENTIFIER ALLOCATION APPARATUS AND METHOD, BASE STATION, READABLE PROGRAM AND MEDIUM

CROSS-REFERENCE TO RELATED APPLICATIONS

This application is a continuation of International Application PCT/CN2011/073517, filed on Apr. 29, 2011, now pending, the contents of which are herein wholly incorporated by reference.

TECHNICAL FIELD

The present invention relates to transmission technologies in a communication system, and more particularly, to a cell identifier allocation apparatus and a cell identifier allocation method in a heterogeneous network of an LTE-A system.

BACKGROUND

Long Term Evolution (LTE) of 3GPP continues to use a traditional homogeneous network which is constructed by a hexagonal cellular system. In order to further improve system capacity, Advanced LTE (LTE-A) of a next generation wireless communication system introduces a heterogeneous network. The LTE-A system includes a macro cell, a femto cell, a pico cell, a Remote Radio Head (RRH) and a relay. By deploying new wireless nodes, the LTE-A system not only improves the system capacity, but also provides better services to the users of special areas and optimizes the system performance. On the other hand, the newly deployed nodes bring interferences to the users of the originally deployed cells, and an enhanced interference coordination method is required. Coordinated Multi-Point (CoMP) technology uses multiple cells for a joint transmission, thereby suppressing the inter-cell interferences and improving the system performance.

Figure 1:
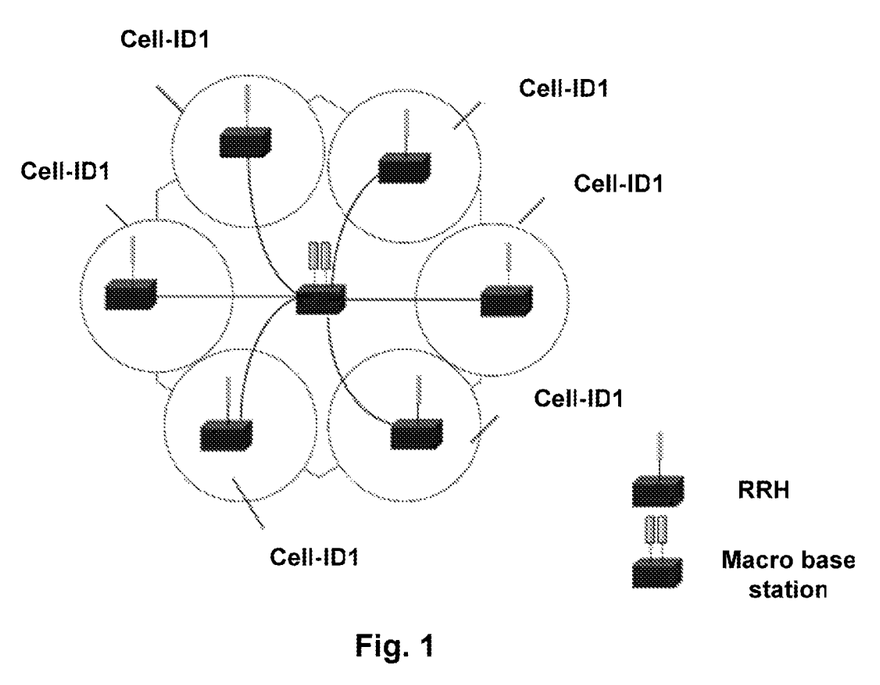
FIG. 1 illustrates a first configuration of a heterogeneous network including a macro base station and an RRH.
Figure 2:
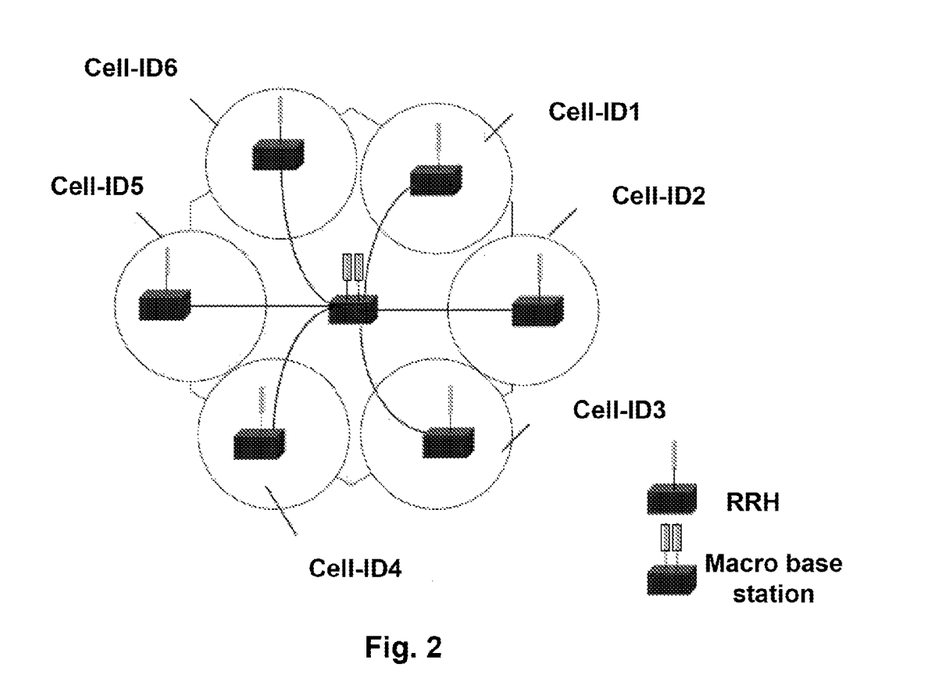
FIG. 2 illustrates a second configuration of a heterogeneous network including a macro base station and an RRH.

In the heterogeneous network including the macro cell and the RRH, cells may be deployed in two modes. FIG. 1 illustrates a first configuration of the heterogeneous network including a macro base station and the RRH. As illustrated in FIG. 1, a first mode is that the macro cell and the RRH use the same cell identifier (Cell-ID). Under this scenario, the macro cell and the RRH use the same PDCCH, PHICH, PCFICH, PBCH, PSS, SSS, SIB channel and CRS, but the PDSCH channel may be multiplexed in the CoMP transmission mode. This deployment mode has the following advantages: (1) the PDCCH/PHICH/PCFICH/PBCH/PSS/SSS channel can obtain the diversity gain; and (2) there is no inter-CRS interference between the cells. The disadvantage is that the multiplexing gain will be lost in the PDCCH/PBCH/PSS/SSS channel. FIG. 2 illustrates a second configuration of the heterogeneous network including the macro base station and the RRH. As illustrated in FIG. 2, a second mode is that the macro cell and the RRH use different cell identifiers (Cell-IDs). Under this scenario, the macro cell and the RRH multiplex the PDCCH, PDSCH, PHICH, PCFICH, PBCH, PSS, SSS, SIB channel and CRS. This solution has the following advantages: (1) a maximum channel multiplexing gain can be obtained; and (2) a smooth evolution is made in the previous interference coordination mechanism, and a good compatibility is achieved. The disadvantage is that there are strong inter-cell interfaces, and the diversity gain cannot be obtained. FIG. 1 illustrates a schematic diagram of the two scenarios.

Under both cell deployment modes, the PDSCH can obtain the multiplexing gain, but the PDCCH/PHICH/PCFICH/PBCH/PSS/SSS/CRS have different transmission modes. The design objective of the solution of FIG. 1 is to obtain the diversity gain, and the design objective of the solution of FIG. 2 is to obtain the multiplexing gain.

In the studies the inventor finds that the solution of the prior art is not flexible enough, and it can only implement the diversity gain or the multiplexing gain, and the system capacity is limited to be further improved. Therefore, an allocation method relating to the cell identifier is required for a compromise between the diversity gain and the multiplexing gain.

Although the above technical solutions are proposed in the Background section for the convenience of description, it shall not be deemed that they are well known to a person skilled in the art.

SUMMARY

Therefore, proposed with respect to the above problems of the prior art, so as to relieve or overcome one or more deficiencies caused by the limitations of the prior art, and provide at least one beneficial selection.

According to one aspect of the present invention, a cell identifier allocation method is provided, comprising: a location information acquisition process for acquiring location information of a macro base station and location information of each of a plurality of remote transmitting apparatuses connected to the macro base station; a relative distance determination process for determining relative distances between the plurality of remote transmitting apparatuses and relative distances between the macro base station and each of the plurality of remote transmitting apparatuses, according to the location information of the macro base station and the location information of each of the plurality of remote transmitting apparatuses connected to the macro base station acquired in the location information acquisition process; a set classification process for classifying the macro base station and the plurality of remote transmitting apparatuses into a plurality of sets, according to the relative distances between the plurality of remote transmitting apparatuses and the relative distances between the macro base station and each of the plurality of remote transmitting apparatuses; a cell identifier allocation process for allocating cell identifiers to the plurality of remote transmitting apparatuses: remote transmitting apparatuses in a same set are allocated with a same cell identifier, remote transmitting apparatuses in different sets are allocated with different cell identifiers, and the macro base station is allocated with a cell identifier the same as those of remote transmitting apparatuses in a set where the macro base station is located; and an information generation process for generating information to be transmitted to corresponding remote transmitting apparatus according to the allocated cell identifier.

According to another aspect of the present invention, a cell identifier allocation apparatus is provided, comprising: a location information acquisition unit, configured to acquire location information of a macro base station and location information of each of a plurality of remote transmitting apparatuses connected to the macro base station; a relative distance determination unit, configured to determine relative distances between the plurality of remote transmitting apparatuses and relative distances between the macro base station and each of the plurality of remote transmitting apparatuses, according to the location information of the macro base station and the location information of each of the plurality of remote transmitting apparatuses connected to the macro base station acquired by the location information acquisition unit; a set classification unit, configured to classify the macro base station and the plurality of remote transmitting apparatuses into a plurality of sets, according to the relative distances between the plurality of remote transmitting apparatuses and the relative distances between the macro base station and each of the plurality of remote transmitting apparatuses; a cell identifier allocation unit, configured to allocate cell identifiers to the plurality of remote transmitting apparatuses: remote transmitting apparatuses in a same set are allocated with a same cell identifier, remote transmitting apparatuses in different sets are allocated with different cell identifiers, and the macro base station is allocated with a cell identifier the same as those of remote transmitting apparatuses in a set where the macro base station is located; and an information generation unit, configured to generate information to be transmitted to corresponding remote transmitting apparatus according to the allocated cell identifier.

According to still another aspect of the present invention, a base station is provided, comprising the cell identifier allocation apparatus described herein.

According to yet another aspect of the present invention, a logic part readable program and a logic part readable tangible storage medium which stores the logic part readable program are provided, wherein when being executed by a logic part, the logic part readable program enables the logic part to be used as the cell identifier allocation apparatus described herein, or to implement the cell identifier allocation method described herein.

To be noted, the term "comprise/include/have" used herein specifies the presence of feature, integer, step or component, not excluding the presence or addition of one or more other features, integers, steps or components.

The above general descriptions and the following detailed descriptions made with reference to the drawings are all schematic, rather than limitations to the protection scope of the present invention.

BRIEF DESCRIPTION OF THE DRAWINGS

The above and other objects, characteristics and advantages of the present invention will be understood more clearly through the following detailed descriptions of the present invention made with reference to the drawings. Throughout the drawings, the same or similar reference signs denote the same or similar elements.

DETAILED DESCRIPTION OF THE EMBODIMENTS

Several embodiments are described as follows with reference to the drawings. The embodiments are all exemplary, rather than limitations to the protection scope of the present invention.

Figure 3:
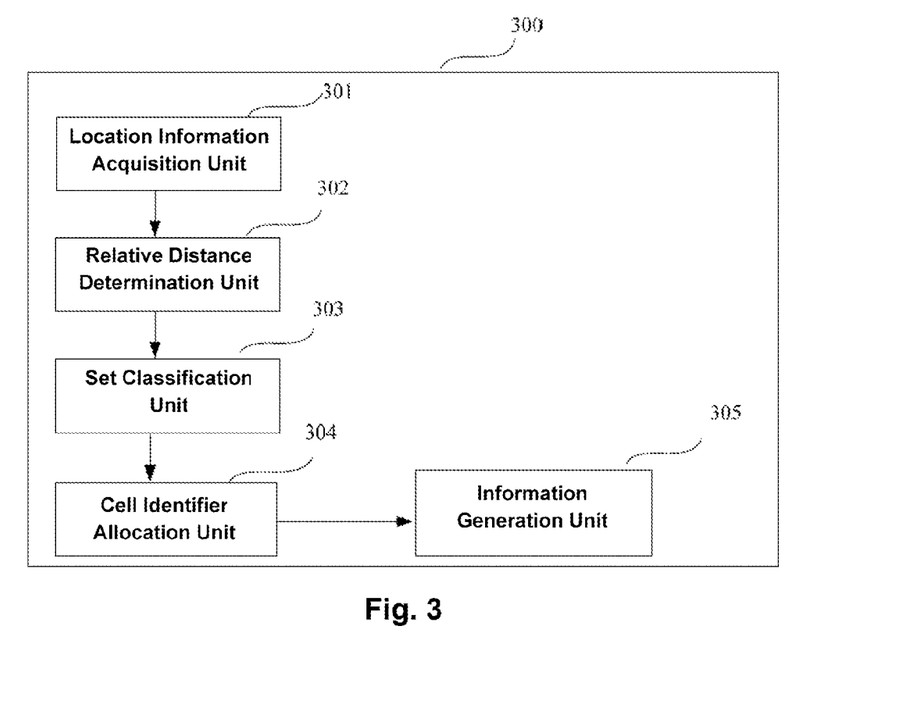
FIG. 3 illustrates a block diagram of a macro base station 300 according to an embodiment.

FIG. 3 illustrates a block diagram of a cell identifier allocation apparatus 300 according to an embodiment. The apparatus may be used in a macro base station, or separated from the macro base station but connected thereto. As illustrated in FIG. 3, according to an embodiment, the cell identifier allocation apparatus 300 comprises: a location information acquisition unit 301 configured to acquire location information of the macro base station and location information of each of a plurality of Remote Radio Heads (RRHs) connected to the macro base station; a relative distance determination unit 302 configured to determine relative distances between the plurality of RRHs and relative distances between the macro base station and each of the plurality of RRHs, according to the location information of the macro base station and the location information of each of the plurality of RRHs connected to the macro base station acquired by the location information acquisition unit; a set classification unit 303 configured to classify the macro base station and the plurality of RRHs into a plurality of sets, according to the relative distances between the plurality of RRHs and the relative distances between the macro base station and each of the plurality of RRHs; a cell identifier allocation unit 304 configured to allocate cell identifiers to the plurality of RRHs: RRHs in a same set are allocated with a same cell identifier, RRHs in different sets are allocated with different cell identifiers, and the macro base station is allocated with a cell identifier the same as those of RRHs in a set where the macro base station is located; and an information generation unit 305 configured to generate information to be transmitted to corresponding RRH according to the allocated cell identifier.

Herein the RRH is taken as an example of the remote transmitting apparatus, but the remote transmitting apparatus may be implemented by other apparatuses, such as femto cell base station, pico cell base station, relay, etc., provided that they have service ranges of themselves and require an allocation of cell identifiers.

In one embodiment, the location information acquisition unit 301 is a location measurement unit which determines the location of each of the plurality of RRHs and the location of the macro base station by using measurement. In another embodiment, each of the plurality of RRHs determines its own location (e.g., by using GPS positioning), and sends the location to the location information acquisition unit 301. Thus in this embodiment, the location information acquisition unit 301 is an information reception unit. In another embodiment, the location information acquisition unit 301 sends a request message to each of the plurality of RRHs to indicate it to report location information and then receives the location information therefrom. In this embodiment, the location information acquisition unit 301 is a combination of a request sending unit and an information reception unit. In another embodiment, the location information acquisition unit 301 acquires the location information of the macro base station or the RRH from a storage unit of the macro base station. In that case, the location information acquisition unit 301 is a combination of the storage unit and a reading unit. The above embodiments also can be combined. For example, the location information acquisition unit 301 may comprise a storage unit which stores location information of the macro base station and some RRHs, a reading unit which reads the stored information, and a measurement unit which measures the locations of other RRHs. In summary, the location information acquisition unit 301 may be implemented in various manners known by a person skilled in the art at present or in the future.

The set classification unit 303 may perform the set classification in various methods. In one embodiment, the set classification unit 303 classifies RRHs having their relative distances smaller than a predetermined distance into a same set, and then classifies the macro base station into a set comprising an RRH closest to the macro base station.

For example, if the distance between RRH1 and RRH2 is D12, the distance between RRH1 and RRH3 is D13, and the distance between RRH2 and RRH3 is D23, RRH1, RRH2 and RRH3 are classified into the same set only when each of D12, D13 and D23 is smaller than the predetermined distance. If D12 and D13 are smaller than the predetermined distance while D23 is larger than the predetermined distance, for example RRH1 and RRH2 are classified into the same set and RRH3 is classified into another set, or RRH1 and RRH3 are classified into the same set and RRH2 is classified into another set. In that case, assuming that the distance between the macro base station and RRH1 is D1B, the distance between the macro base station and RRH2 is D2B, and the distance between the macro base station and RRH3 is D3B, the smaller one of D1B and D2B is determined (this distance is also referred to as the distance from the base station to the set where RRH1 and RRH2 are located) and compared with D3B; if D3B is smaller, the macro base station is classified into the set where RRH3 is located, and if D3B is larger, the macro base station is classified into the set where RRH1 and RRH2 are located.

In another embodiment, the set classification unit 303 performs the set classification by classifying each of the plurality of RRHs and those having their distances thereto smaller than a predetermined distance into a same set, and then classifying the macro base station into a set comprising an RRH closest to the macro base station.

For example, if the distance between RRH1 and RRH2 is D12, the distance between RRH1 and RRH3 is D13, and the distance between RRH2 and RRH3 is D23, RRH1, RRH2 and RRH3 may be classified into the same set provided that D12 and D13 are smaller than the predetermined distance, regardless of whether D23 is smaller than the predetermined distance, and then other RRH (e.g., RRH4) is selected for similar determination. In that case, it is obvious for a person skilled in the art that the relative distance determination unit 302 needs not to measure D23. Thus, herein the number of the relative distances between the RRHs and the number of the distances between the RRHs and the macro base station to be calculated by the relative distance determination unit 302 may vary with the algorithm of the set classification unit 303, and it shall not be mechanically or idealizedly construed as determining the relative distances between all the RRHs and the distances between the macro base station and all the RRHs.

In still another embodiment, the set classification unit 303 performs the set classification by classifying an RRH which is not classified into any set, into a set comprising an RRH having its distance thereto smaller than a predetermined distance, and then classifying the macro base station into a set comprising an RRH closest to the macro base station.

For example, if the distance between RRH1 and RRH2 is D12, the distance between RRH1 and RRH3 is D13, and the distance between RRH2 and RRH3 is D23, RRH1 and RRH2 are classified into a same set when D12 is smaller than a predetermined distance. In that case, RRH3 may be classified into the set where RRH1 and RRH2 are located once one of D13 and D23 is smaller than the predetermined distance. That is, RRH1, RRH2 and RRH3 may be classified into the same set provided that D13 is smaller than the predetermined distance, regardless of whether D23 is smaller than the predetermined distance, and then other RRH (e.g., RRH4) is selected for similar determination. In that case, it is obvious for a person skilled in the art that the relative distance determination unit 302 also needs not to measure D23. Thus, herein the number of the distances between the RRHs one another and the number of the distances between the RRHs and the macro base station to be calculated by the relative distance determination unit 302 may vary with the algorithm of the set classification unit 303, and it shall not be mechanically or idealizedly construed as determining the distances between all the RRHs one another and the distances between the macro base station and all the RRHs.

In yet another embodiment, the set classification unit 303 performs the calculation by taking the macro base station as an RRH, i.e., the macro base station is deemed as an ordinary total set element in a total set composed of the macro base station and all the RRHs. The set classification is performed by classifying total set elements having their relative distances smaller than a predetermined distance among the total set composed of the plurality of RRHs and the macro base station into a same set, or by classifying each of the total set elements and those having their distances thereto smaller than a predetermined distance into a same set, or by classifying a total set element which is not classified into any set, into a set comprising the total set element having its distance thereto smaller than the predetermined distance.

In that case, when the macro base station is classified into an individual set, it may be classified into a set where an RRH closest thereto is located in the above method.

When the remote transmitting apparatuses are the RRHs, the information generation unit 305 generates information to be transmitted to corresponding RRH according to the allocated cell identifier, and the information may be transmitted by the RRH directly. When the remote transmitting apparatuses are micro base stations such as the femto cell base stations, the pico cell base stations, etc., the information generation unit 305 may directly encapsulate the allocated cell identifier separately or together with other information, and transmit to those base stations.

Figure 4:
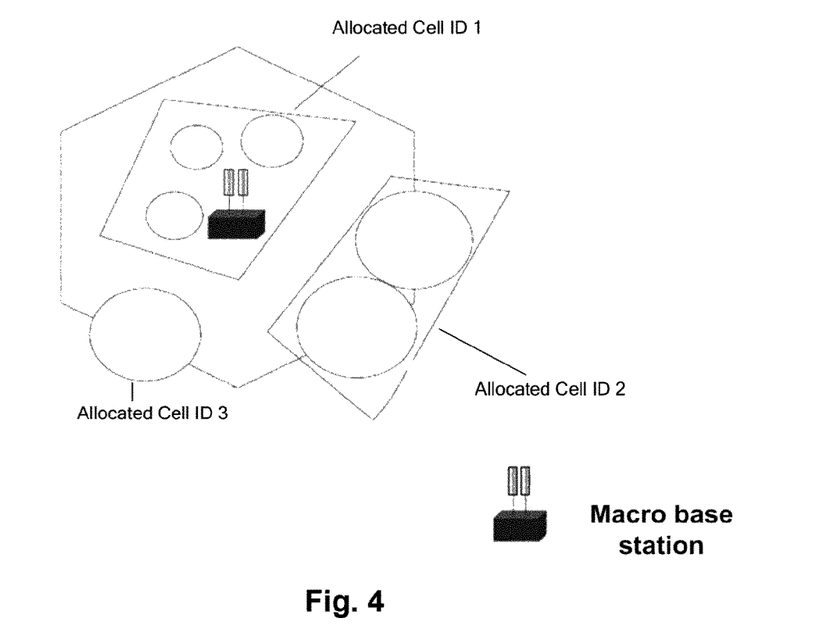
FIG. 4 schematically illustrates a cell identifier allocation diagram according to an embodiment.

FIG. 4 schematically illustrates a cell identifier allocation diagram according to an embodiment. As illustrated in FIG. 4, the whole macro cell has three cell identifiers (Cell-IDs), and the cells in each box have the same Cell-ID. Under such deployment of Cell-IDs, cells having the same Cell-ID transmit the same PDCCH/PHICH/PCFICH/PBCH/PSS/SSS/CRS, and share those transmission channels, wherein the PDSCH may be multiplexed in the CoMP mode. For the cells having different Cell-IDs, their PDCCH/PHICH/PCFICH/PBCH/PSS/SSS/CRS/PDSCH may be multiplexed, like the cell splitting technology.

For PDCCH/PHICH/PCFICH/PBCH/PSS/SSS/CRS/PDSCH, the CoMP transmission scheme of same Cell-ID may acquire the diversity gain, and the CoMP transmission scheme of different Cell-IDs may acquire the multiplexing gain.

Figure 5:
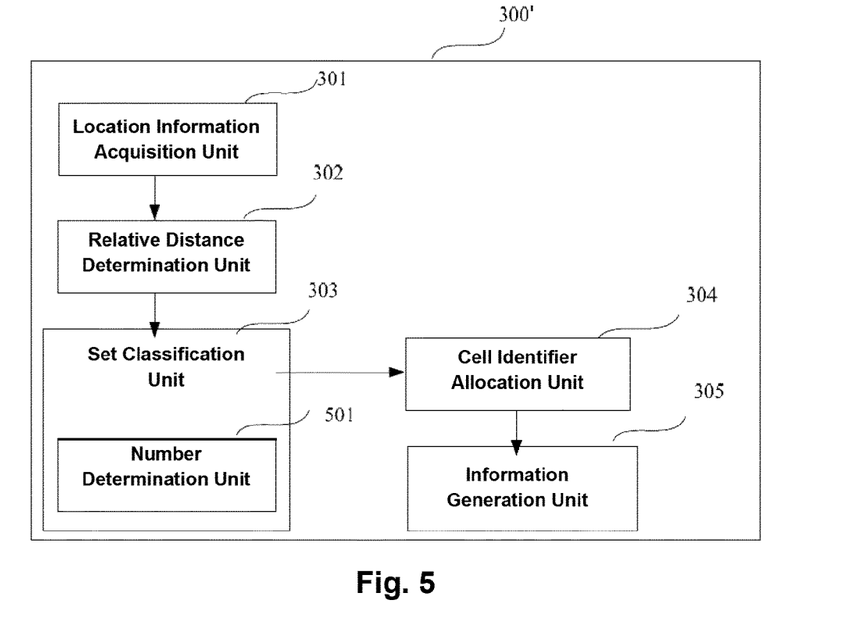
FIG. 5 schematically illustrates a block diagram of a macro base station 300' according to another embodiment.

FIG. 5 schematically illustrates a block diagram of a cell identifier allocation apparatus 300' according to another embodiment. The cell identifier allocation apparatus 300' illustrated in FIG. 5 differs from the cell identifier allocation apparatus 300 illustrated in FIG. 3 in that the set classification unit 303 comprises a number determination unit 501 configured to ensure that the number of the apparatuses in a set classified by the set classification unit does not exceed a predetermined number. For example, the number determination unit 501 judges the number of the RRHs or a total number of the RRHs and the macro base station in a set classified by the set classification unit, and no longer adds new RRH or macro base station to the set when the number of the RRHs or the total number of the RRHs and the macro base station is larger than the predetermined number.

When the diversity order is higher than a certain value, the system performance will be saturated and the gain is very small. On the other hand, when the multiplexing factor is large, the inter-cell interference of the system will be increased obviously while the system throughput is decreased. Thus according to the embodiment, a better compromise between the diversity gain and the multiplexing gain can be further achieved by considering the relative distances between the RRHs and the number of RRHs with the same cell identifier.

Figure 6:
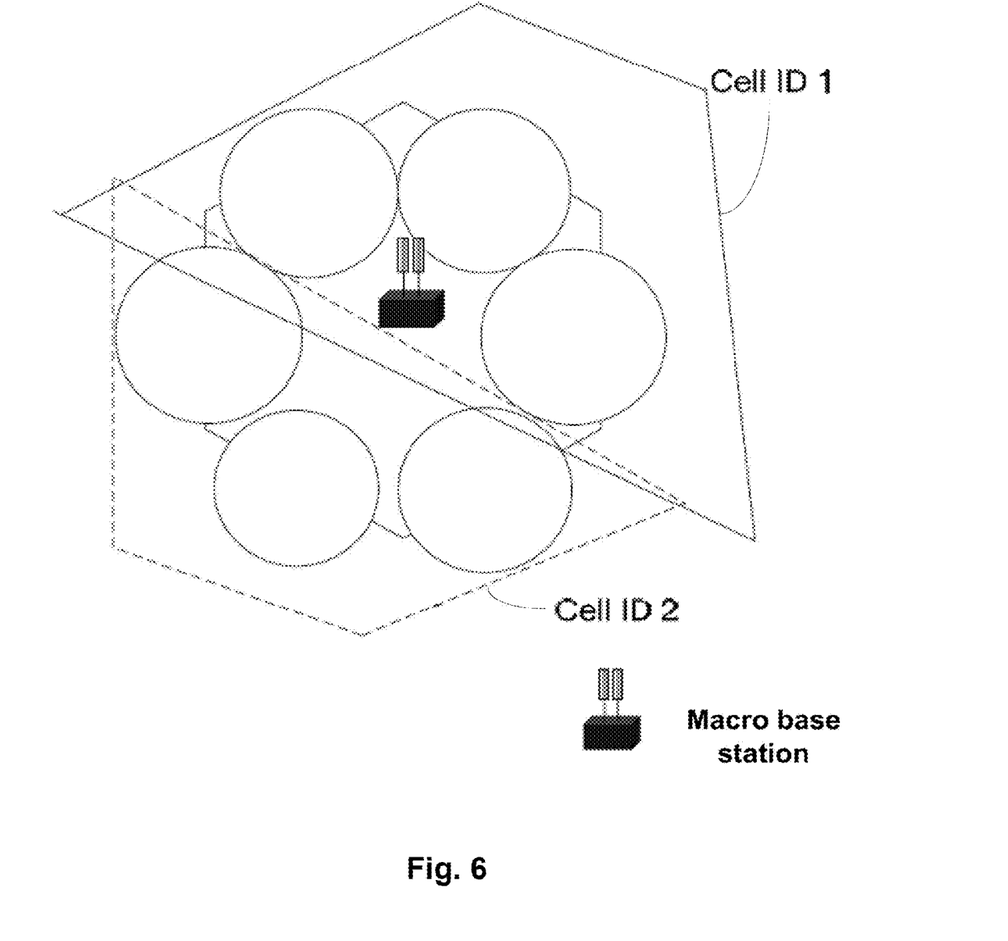
FIG. 6 illustrates the allocation of cell identifiers in a quantity principle.

When the relative distances between the cells are large, the inter-cell interference is small due to the attenuation of electric waves in the spatial channel transmission, which is suitable for inter-cell user multiplexing. Thus, the cells can be allocated with the same Cell-ID only when the relative distances between them are smaller than a certain threshold. However, the diversity gain will be saturated when the diversity gain is larger than a certain order. On the other hand, the expansion of the cells having the same Cell-ID potentially increases the distances between the cells at the two ends, thus the number of the cells having the same Cell-ID shall be smaller than a certain threshold. In one embodiment, the total number of the RRHs and the macro base station in the cells having the same Cell-ID is set to be not more than 4, and it may also be 2 or 3. This is because: (1) the 4-order diversity has tended to be saturated; and (2) the CSI-RS of the cell is easily configured. FIG. 6 illustrates the allocation of cell identifiers in a quantity principle. As illustrated in FIG. 6, the number of cells in Cell-ID1 is 4, and the number of cells in Cell-ID2 is 3.

Figure 7:
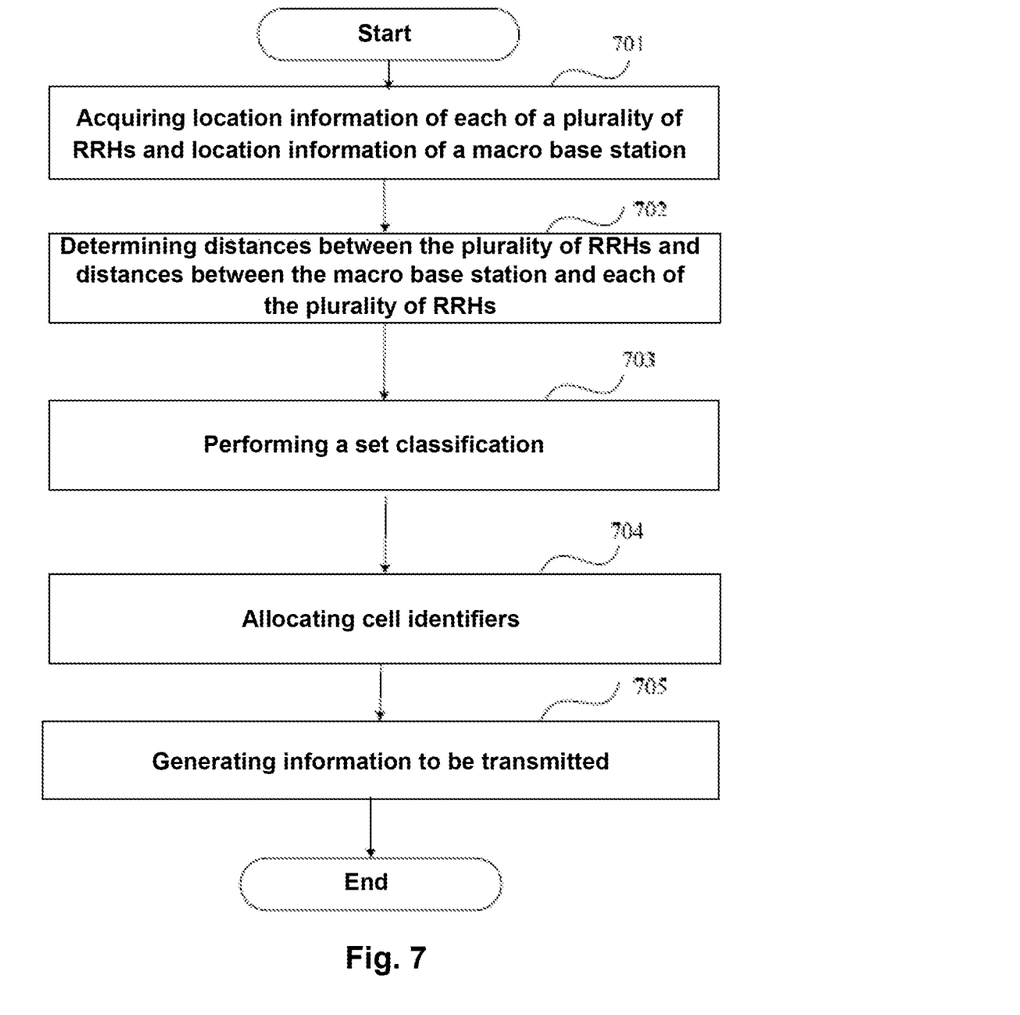
FIG. 7 illustrates a block diagram of a cell identifier allocation method according to an embodiment.

FIG. 7 illustrates a cell identifier allocation method according to an embodiment of the present invention. As illustrated in FIG. 7, firstly in step 701, location information of each of a plurality of RRHs and location information of a macro base station is acquired. Next, in step 702, relative distances between the plurality of RRHs and distances between the macro base station and each of the plurality of RRHs are determined, according to the location information of each of the plurality of RRHs and the location information of the macro base station. Next in step 703, a set classification is performed according to the determined relative distances between the plurality of RRHs and distances between the macro base station and each of the plurality of RRHs. In step 704, cell identifiers are allocated according to the classified set: RRHs or macro base stations in a same set are allocated with a same cell identifier, and RRHs in different sets are allocated with different cell identifiers. Finally, in step 705, information to be transmitted by each of the plurality of RRHs is generated according to the cell identifiers. When the remote transmitting apparatus is an apparatus (e.g., micro base station) capable of generating the data to be transmitted by itself, information only comprising the allocated cell identifier may be generated in step 705.

Figure 8:
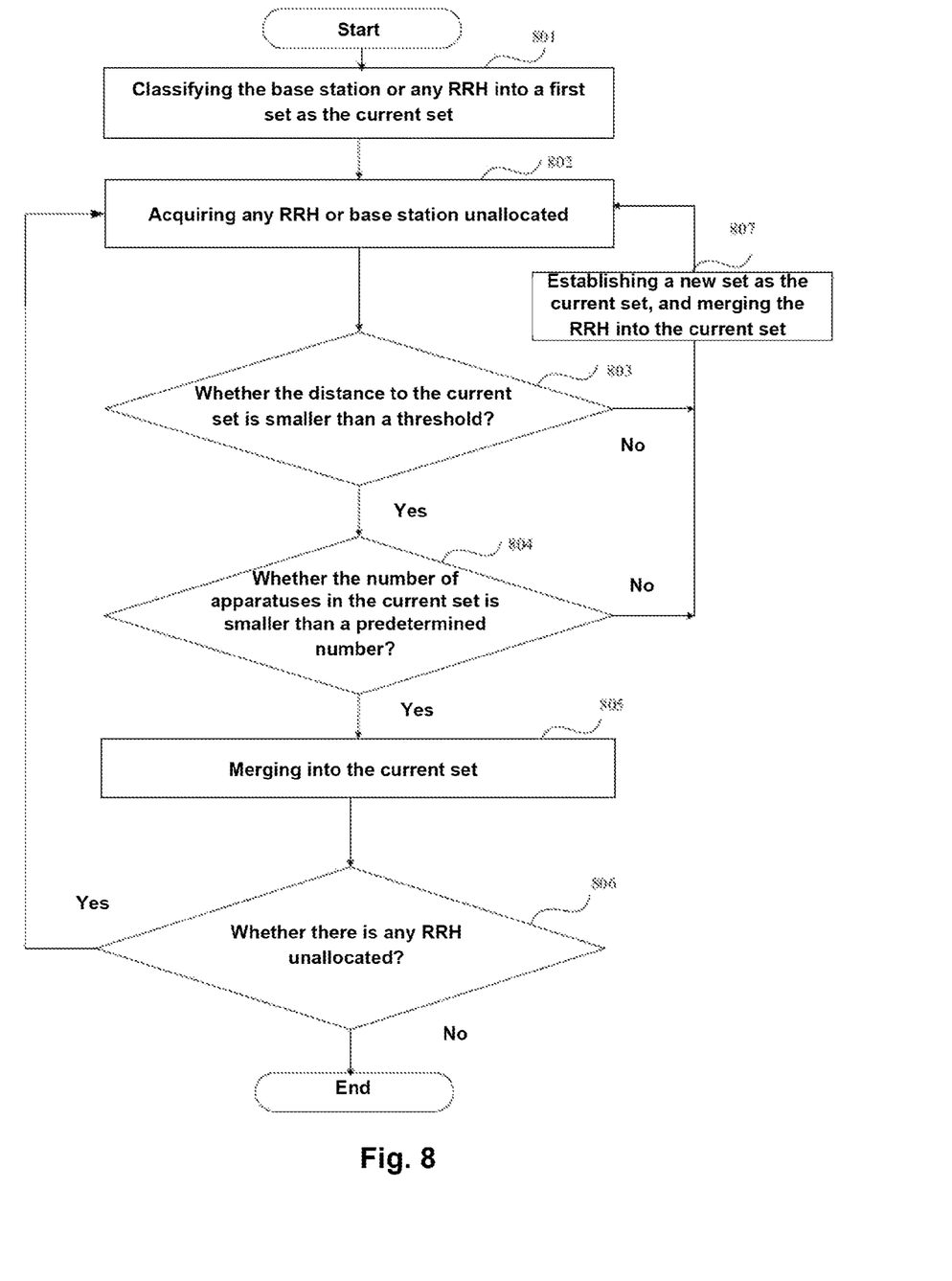
FIG. 8 illustrates a flowchart of a set classification method according to an embodiment.

FIG. 8 illustrates a flowchart of a set classification method according to an embodiment of the present invention. FIG. 8 may be deemed as an exemplary development of step 703 in FIG. 7. As illustrated in FIG. 8, firstly in step 801, the base station or any RRH is classified into a current set; next in step 802, an unallocated RRH is randomly selected, and it is judged in step 803 whether the minimum distance (also referred to as the distance to the current set) among the distances from the RRH to any RRH or base station in the current set is smaller than a predetermined threshold (predetermined distance); if the minimum distance is smaller than the predetermined threshold (step 803: Yes), it is judged in step 804 whether the number of the RRHs or a total number of the RRHs and the macro base station in the current set is smaller than a predetermined number, and if yes, the RRH is merged into the current set in step 805 and it is judged in step 806 whether there is any RRH or base station unallocated; and if there is any RRH or base station unallocated (step 806: Yes), the process returns to step 802, otherwise the process ends. On the other hand, if it is judged in step 803 that the distance from the unallocated RRH or base station acquired in step 802 to the current set is larger than the predetermined distance, or it is judged in step 804 that the number of the RRHs or the total number of the RRHs and the macro base station in the current set is not smaller than the predetermined number, the process enters step 807 to establish a new set as the current set, and puts the unallocated RRH or base station acquired in step 802 into the new current set, then returns to step 802.

The above descriptions are just exemplary, and a person skilled in the art can conceive of various flows according to different set classification methods of the set classification unit (e.g., the aforementioned methods for the set classification unit), which are omitted herein.

The description of the apparatus and the description of the method may be understood with reference to each other. Features occurring in one embodiment may be applied to another embodiment in the same or similar way, so as to replace the features in another embodiment or used in combination therewith.

Several embodiments of the above apparatus and methods may be implemented by hardware, or a combination of hardware and software. Several embodiments relate to a logic part readable program which when being executed by a logic part (executed directly or after an interpretation or compilation), enables the logic part to implement the above apparatus or constituent parts, or enables the logic part to implement the aforementioned methods or steps. The logic part for example may be a field programmable logic part, a microprocessor, a processor used in the computer, etc. Several embodiments further relate to a storage medium which stores the above program, such as hard disc, magnetic disc, optical disc, DVD, flash, magnetic optical disc, memory card, memory stick, etc.

The present invention is described as above in conjunction with specific embodiments. But a person skilled in the art shall appreciate that those descriptions are just exemplary, rather than limitations to the protection scope of the present invention. A person skilled in the art can make various modifications and changes to the present invention based on the spirit and the principle of the present invention, and those modifications and changes also fall within the scope of the present invention.

What is claimed is:

1. A cell identifier allocation method, the method comprising:

acquiring, by a location information acquisition process, location information of a macro base station and location information of each of a plurality of remote transmitting apparatuses connected to the macro base station;

determining, by a relative distance determination process, relative distances between the plurality of remote transmitting apparatuses and relative distances between the macro base station and each of the plurality of remote transmitting apparatuses, according to the location information of the macro base station and the location information of each of the plurality of remote transmitting apparatuses connected to the macro base station acquired in the location information acquisition process;

classifying, by a set classification process, the macro base station and the plurality of remote transmitting apparatuses into a plurality of sets, according to the relative distances between the plurality of remote transmitting apparatuses and the relative distances between the macro base station and each of the plurality of remote transmitting apparatuses;

allocating, by a cell identifier allocation process, cell identifiers to the plurality of remote transmitting apparatuses: remote transmitting apparatuses in a same set are allocated with a same cell identifier, remote transmitting apparatuses in different sets are allocated with different cell identifiers, and the macro base station is allocated with a cell identifier the same as cell identifiers of remote transmitting apparatuses in a set where the macro base station is located; and generating, by an information generation process, information to be transmitted to corresponding remote transmitting apparatus according to the allocated cell identifier.

2. The method according to claim 1, wherein the set classification process comprises a number judgment process for ensuring that the number of the remote transmitting apparatuses comprised in each of the plurality of sets classified by the set classification process, or a sum of the number of the comprised remote transmitting apparatuses and the number of the macro base station, is not more than a predetermined number.

3. The method according to claim 2, wherein the predetermined number is 2, 3 or 4.

4. The method according to claim 1, wherein in the set classification process, a set classification is performed by classifying remote transmitting apparatuses having their relative distances smaller than a predetermined distance among the plurality of remote transmitting apparatuses into a same set, and then classifying the macro base station into a set comprising a remote transmitting apparatus closest to the macro base station.

5. The method according to claim 1, wherein in the set classification process, a set classification is performed by, for each of the plurality of remote transmitting apparatuses, classifying the remote transmitting apparatus and other remote transmitting apparatus into a same set; wherein the distance between the remote transmitting apparatus and the other remote transmitting apparatus is smaller than a predetermined distance, and then classifying the macro base station into a set comprising a remote transmitting apparatus closest to the macro base station.

6. The method according to claim 1, wherein in the set classification process, a set classification is performed by classifying a remote transmitting apparatus, which is not classified into any set, into a set comprising a remote transmitting apparatus having its distance thereto smaller than a predetermined distance, and then classifying the macro base station into a set comprising a remote transmitting apparatus closest to the macro base station.

7. The method according to claim 1, wherein in the set classification process, a set classification is performed by classifying total set elements having their relative distances smaller than a predetermined distance among a total set composed of the plurality of remote transmitting apparatuses and the macro base station into a same set, or by classifying each of the total set elements and those having their distances thereto smaller than a predetermined distance into a same set, or by classifying a total set element, which is not classified into any set, into a set comprising a total set element having its distance thereto smaller than a predetermined distance.

8. The method according to claim 7, wherein when the macro base station is classified into an individual set, the macro base station is classified into a set comprising a remote transmitting apparatus closest to the macro base station.

9. The method according to claim 1, wherein in the location information acquisition process, the location information of each of the plurality of remote transmitting apparatuses is acquired by enabling the macro base station to perform a measurement, or by sending an instruction to each of the plurality of remote transmitting apparatuses to require the each of the plurality of remote transmitting apparatuses to report location information and then receiving location information therefrom.

10. A cell identifier allocation apparatus, comprising:

a location information acquisition unit, configured to acquire location information of a macro base station and location information of each of a plurality of remote transmitting apparatuses connected to the macro base station;

a relative distance determination unit, configured to determine relative distances between the plurality of remote transmitting apparatuses and relative distances between the macro base station and each of the plurality of remote transmitting apparatuses, according to the location information of the macro base station and the location information of each of the plurality of remote transmitting apparatuses connected to the macro base station acquired by the location information acquisition unit;

a set classification unit, configured to classify the macro base station and the plurality of remote transmitting apparatuses into a plurality of sets, according to the relative distances between the plurality of remote transmitting apparatuses and the relative distances between the macro base station and each of the plurality of remote transmitting apparatuses;

a cell identifier allocation unit, configured to allocate cell identifiers to the plurality of remote transmitting apparatuses: remote transmitting apparatuses in a same set are allocated with a same cell identifier, remote transmitting apparatuses in different sets are allocated with different cell identifiers, and the macro base station is allocated with a cell identifier the same as cell identifiers of remote transmitting apparatuses in a set where the macro base station is located; and an information generation unit, configured to generate information to be transmitted to corresponding remote transmitting apparatus according to the allocated cell identifier.

11. The apparatus according to claim 10, wherein the set classification unit comprises a number judgment unit for ensuring that the number of the remote transmitting apparatuses comprised in each of the plurality of sets classified by the set classification unit, or a sum of the number of the remote transmitting apparatuses and the number of the macro base station comprised in each of the plurality of sets classified by the set classification unit is not more than a predetermined number.

12. The apparatus according to claim 11, wherein the predetermined number is 2, 3 or 4.

13. The apparatus according to claim 11, wherein the location information acquisition unit acquires the location information of each of the plurality of remote transmitting apparatuses by enabling the macro base station to perform a measurement, or by sending an instruction to each of the plurality of remote transmitting apparatuses to require the each of the plurality of remote transmitting apparatuses to report location information and then receiving location information therefrom.

14. The apparatus according to claim 10, wherein the set classification unit performs a set classification by classifying remote transmitting apparatuses having their relative distances smaller than a predetermined distance among the plurality of remote transmitting apparatuses into a same set, and then classifying the macro base station into a set comprising a remote transmitting apparatus closest to the macro base station.

15. The apparatus according to claim 10, wherein the set classification unit performs a set classification by, for each of the plurality of remote transmitting apparatuses, classifying the remote transmitting apparatus and other remote transmitting apparatus into a same set; wherein the distance between the remote transmitting apparatus and the other remote transmitting apparatus is smaller than a predetermined distance, and then classifying the macro base station into a set comprising a remote transmitting apparatus closest to the macro base station.

16. The apparatus according to claim 10, wherein the set classification unit performs a set classification by classifying a remote transmitting apparatus, which is not classified into any set, into a set comprising remote transmitting apparatuses having its distance thereto smaller than a predetermined distance, and then classifying the macro base station into a set comprising a remote transmitting apparatus closest to the macro base station.

17. The apparatus according to claim 10, wherein the set classification unit performs a set classification by classifying total set elements having their relative distances smaller than a predetermined distance among a total set composed of the plurality of remote transmitting apparatuses and the macro base station into a same set, or by classifying each of the total set elements and those having their distances thereto smaller than a predetermined distance into a same set, or by classifying a total set element, which is not classified into any set, into a set comprising a total set element having its distance thereto smaller than a predetermined distance.

18. The apparatus according to claim 17, wherein when the macro base station is classified into an individual set, the macro base station is classified into a set comprising a remote transmitting apparatus closest to the macro base station.

19. The apparatus according to claim 10, wherein a base station comprising the cell identifier allocation apparatus.

20. A non-transitory computer readable medium comprising a processing circuit readable program, which when executed by the processing circuit, enables the processing circuit to implement a method for:
  acquiring, by a location information acquisition process, location information of a macro base station and location information of each of a plurality of remote transmitting apparatuses connected to the macro base station;
  determining, by a relative distance determination process, relative distances between the plurality of remote transmitting apparatuses and relative distances between the macro base station and each of the plurality of remote transmitting apparatuses, according to the location information of the macro base station and the location information of each of the plurality of remote transmitting apparatuses connected to the macro base station acquired in the location information acquisition process;
  classifying, by a set classification process, the macro base station and the plurality of remote transmitting apparatuses into a plurality of sets, according to the relative distances between the plurality of remote transmitting apparatuses and the relative distances between the macro base station and each of the plurality of remote transmitting apparatuses;
  allocating, by a cell identifier allocation process, cell identifiers to the plurality of remote transmitting apparatuses: remote transmitting apparatuses in a same set are allocated with a same cell identifier, remote transmitting apparatuses in different sets are allocated with different cell identifiers, and the macro base station is allocated with a cell identifier the same as cell identifiers of remote transmitting apparatuses in a set where the macro base station is located; and
  generating, by an information generation process, information to be transmitted to corresponding remote transmitting apparatus according to the allocated cell identifier.

* * * * *